United States Patent
Wilson

(10) Patent No.: US 8,186,391 B2
(45) Date of Patent: May 29, 2012

(54) REVERSIBLE CONTAINER

(76) Inventor: Jonathan Wilson, Des Moines, IA (US)

( * ) Notice: Subject to any disclaimer, the term of this patent is extended or adjusted under 35 U.S.C. 154(b) by 1042 days.

(21) Appl. No.: 12/125,254

(22) Filed: May 22, 2008

(65) Prior Publication Data

US 2009/0288733 A1    Nov. 26, 2009

(51) Int. Cl.
*B65B 1/04* (2006.01)
(52) U.S. Cl. .......... 141/2; 141/11; 141/18; 141/80; 141/113; 220/200
(58) Field of Classification Search .......... 141/2, 11, 141/18, 80, 113; 220/200
See application file for complete search history.

(56) References Cited

U.S. PATENT DOCUMENTS

| | | | |
|---|---|---|---|
| 420,736 A | 2/1890 | Richards | |
| 1,338,688 A | 5/1920 | Harbeck | |
| 3,071,281 A | 1/1963 | Sawai | |
| 3,096,903 A * | 7/1963 | Grant | 220/800 |
| 3,211,322 A | 10/1965 | Collons | |
| 3,317,109 A * | 5/1967 | Palmer | 229/5.5 |
| 3,756,493 A * | 9/1973 | Holmes | 229/5.5 |
| 4,163,517 A | 8/1979 | Kappler et al. | |
| 4,495,209 A * | 1/1985 | Whiteside | 426/392 |
| 5,188,253 A | 2/1993 | Poore et al. | |
| 5,197,658 A | 3/1993 | Sprunger | |
| D376,979 S | 12/1996 | Davidson, III | |
| 5,782,373 A | 7/1998 | Bianchi | |
| 6,719,159 B2 | 4/2004 | Chomik | |
| 2003/0005617 A1 | 1/2003 | Holverson, Jr. | |
| 2004/0245207 A1 | 12/2004 | Chomik | |
| 2009/0223999 A1 * | 9/2009 | Hill et al. | 222/129 |

* cited by examiner

*Primary Examiner* — Gregory Huson
*Assistant Examiner* — Nicolas A Arnett
(74) *Attorney, Agent, or Firm* — Davis Brown Law Firm; Emily E. Harris

(57) ABSTRACT

A reversible container is provided with a hollow housing and removable closures at each end. The container is filled with a substance, and when at least some of the substance has been removed, the container is refilled with the substance and inverted. In this way, the user is able to use substantially all of the contents of the container, and is able to use completely the older substance first, because the older substance is at the top of the container after the container is inverted.

8 Claims, 3 Drawing Sheets

REVERSIBLE CONTAINER

BACKGROUND OF THE INVENTION

1. Field

The present invention relates to a refillable container. In particular, the invention relates to a reversible container that allows a user to use substantially all of the contents of a container, then refill the container and use the remaining original contents, thus avoiding accumulation of stale product.

2. Background

Refillable containers or canisters are used to hold a variety of substances, including kitchen items such as flour, sugar, coffee, tea, and spices. Refillable canisters also hold substances such as laundry detergent and other cleaning supplies, pet food, and even medicines. In order to obtain a product from a canister, a person removes the lid, extracts the substance from the canister using a scoop or other means, and replaces the lid. The shape and size of a canister can prevent a user from extracting the last bit of the product from the container. The remainder of the substance is usually thrown away or, more likely, the user refills the container by placing fresh product on top of the remaining product. If fresh product is placed on top of the original product that cannot be extracted, the bottom of the container will contain older product growing progressively more stable.

Thus, the need exists for a refillable container that allows a person to use all of the contents and prevents accumulation of old, stale product.

SUMMARY OF THE INVENTION

An object of the present invention is to provide a refillable canister that allows a user conveniently to use all substantially of the product in the canister, and the ability to refresh the canister and still use the oldest product first.

Another object of the present invention is to provide a canister with openings and closures at both ends.

A further object of the present invention is to provide a method of using a canister with openings and closures at both ends.

These and other objects of the present invention will become apparent to those skilled in the art upon reference to the following specifications, drawings, and claims.

The present invention intends to overcome difficulties encountered heretofore and enhance the ability to use and/or consume unspoiled products. To that end, an improved canister and a method of using the improved canister are provided. A canister with openings and closures at both ends is described.

DETAILED DESCRIPTION OF THE INVENTION

Figure 1:
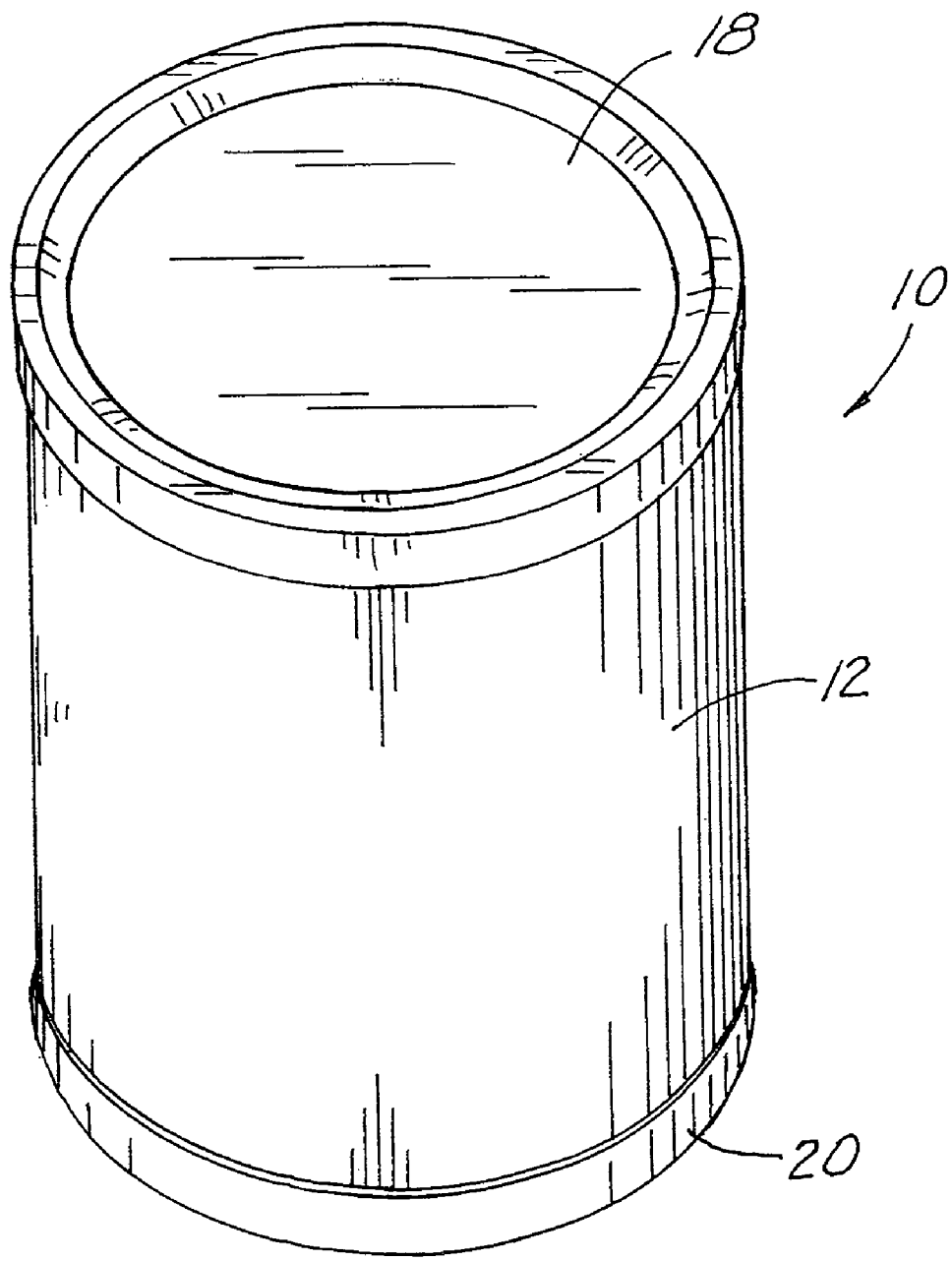
FIG. 1 is a perspective view of the refillable canister of the present invention.
Figure 2:
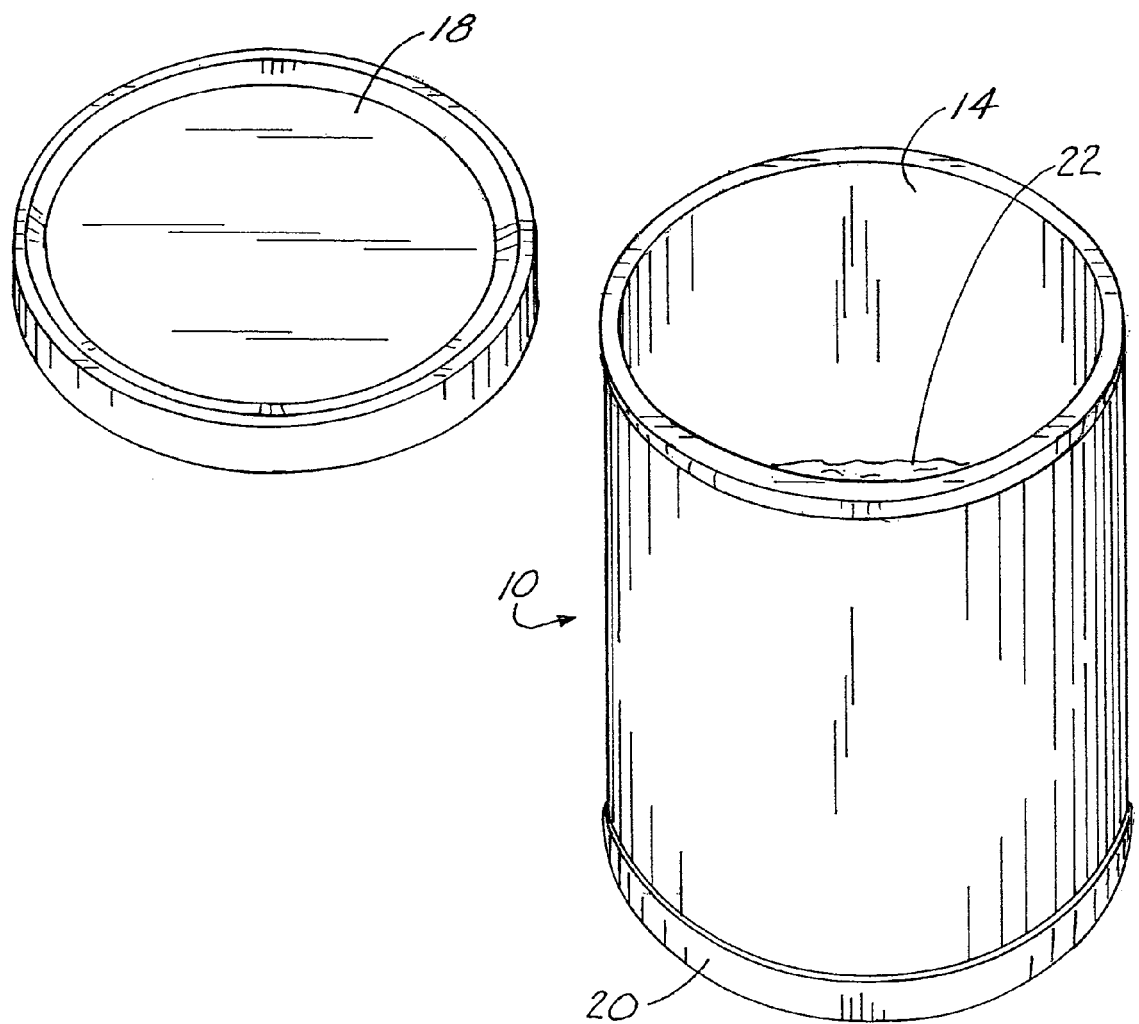
FIG. 2 is perspective view of the refillable canister and covers of the present invention.
Figure 3:
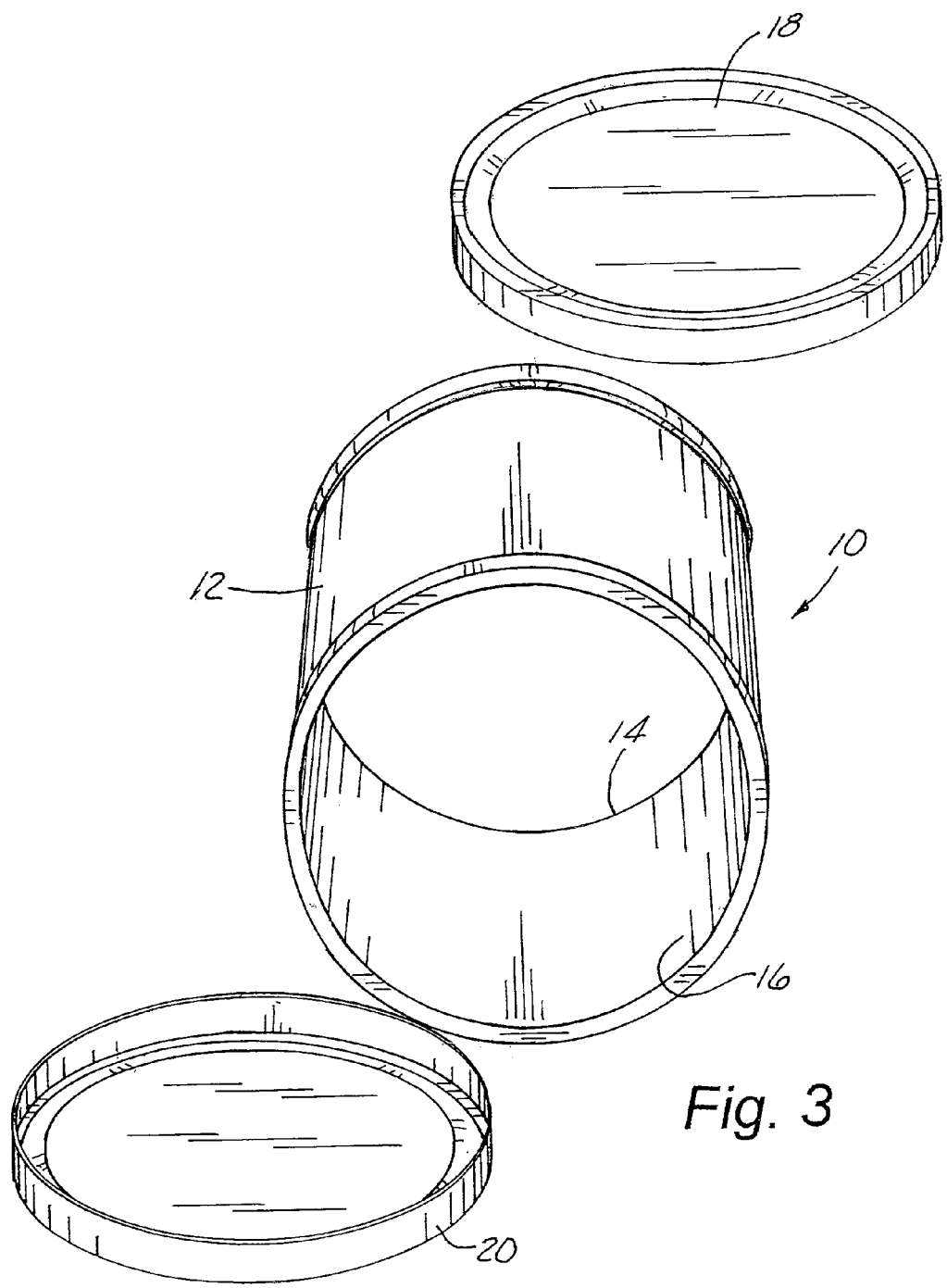
FIG. 3 is a view of the refillable canister and covers of the present invention.

FIGS. 1-3 illustrate the canister 10 of the present invention. The canister 10 includes a canister body 12. The canister body 12 has openings 14, 16 at both ends. Two closure means 18, 20, such as lids are used to close the openings 14, 16. The closure means 18, 20 can be lids that securely fit over the openings 14, 16 and the canister body 12; the closure means 18, 20 may also screw onto the canister body 12 or fit within the openings 14, 16.

As shown in FIG. 2, canister cover 20 acts as the base of the canister 10, such that the canister can be filled with a substance 22. Cover 18 is placed on the canister 10, and a user removes cover 18 to remove substance 22. When some or most all of the substance 22 has been removed from the canister 10, the user refills the canister 10 with substance 22 and then inverts the canister 10, such that cover 18 becomes the base of the canister 10, and cover 20 becomes the closure for the canister 10. After the canister 10 has been refilled and inverted, a user removes cover 20 to obtain substance 22. Due to the inversion of the canister 10, the older substance 22 is on top and will be used first. In this way, the reversible canister 10 allows a user to consume all of the substance 22 in the canister 10 and insures that the oldest substance 22 in the container 10 will be virtually used completely before the newly added substance.

An example of the use of the canister 10 includes use of the canister 10 to hold coffee. A person fills the canister 10 with coffee, with closure means 20 placed on the surface-end of the canister 10 to act as a base. Closure means 18 is placed on the top end of the canister body 12 to seal the coffee and keep the coffee fresh. People who need coffee remove the closure means 18, and remove the desired amount of coffee from the canister 10. When most of the contents of the canister 10 has been used, the canister 10 is refilled with fresh coffee and then inverted so that closure means 18 becomes the base of the canister and closure means 20 becomes the lid. Then, when more coffee is needed, lid 20 is removed and the coffee used next is the older coffee. In this way, the user first uses all of the coffee that was originally placed in the canister 10, before using the refilled coffee.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention. For example, while the example provided describes use of the refillable canister with coffee, the canister can be used for any type of dry product, including food substances such as flour, sugar and spices, medicines, and other substances like laundry detergent and pet food that consumers typically refill periodically. In addition, the canister 10 can be of any size, including of a size appropriate to hold spices. The canister 10 can also be of any shape, including square, triangular, or rectangular, and can be made from any generally solid material, such as plastic, wood, glass, ceramic, or metal.

The invention claimed is:

1. A method of refreshing the contents of a container, comprising the steps of:
   a) providing a container comprising:
      i) a hollow housing with openings at a first end and a second end;
      ii) a first cover to releasably close the opening at the first end; and iii) a second cover to releasably close the opening at the second end;
b) closing the opening at the first end of the container with the first cover;
c) filling the container with a substance through the opening at the second end;
d) removing at least some of the substance in the container;
e) refilling the container after at least some of the original substance has been removed;
f) closing the opening at the second end of the container with the second cover; and
g) inverting the container.

2. The method of claim 1, further comprising the step of removing the first cover after the container has been inverted and removing the remainder of the substance that was originally placed in the container.

3. The method of claim 1, wherein the substance is coffee.

4. The method of claim 1, wherein the substance is flour.

5. The method of claim 1, wherein the substance is sugar.

6. The method of claim 1, wherein the substance is a spice.

7. The method of claim 1, wherein the substance is pet food.

8. The method of claim 1, wherein the substance is medicine.

* * * * *